Figure 1:
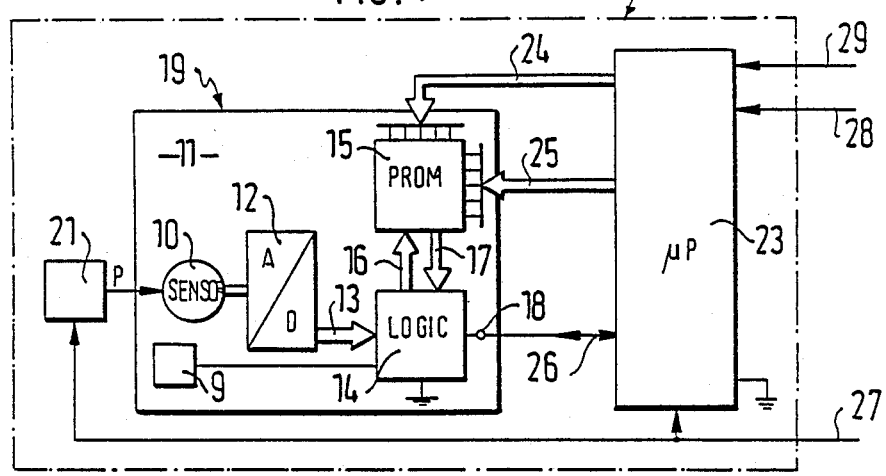

United States Patent [19]

Eckardt et al.

[11] Patent Number: 4,845,649

[45] Date of Patent: Jul. 4, 1989

[54] SENSOR FOR MEASURING PHYSICAL DIMENSIONS AND PROCESS FOR BALANCING THE SENSOR

[75] Inventors: Dieter Eckardt, Nuremberg; Gerhard Hettich, Rosstal; Hans-Dieter Schmid, Nuremburg, all of Fed. Rep. of Germany

[73] Assignee: Robert Bosch GmbH, Stuttgart, Fed. Rep. of Germany

[21] Appl. No.: 262,079

[22] Filed: Oct. 24, 1988

Related U.S. Application Data

[63] Continuation of Ser. No. 907,689, Aug. 14, 1986, abandoned.

[30] Foreign Application Priority Data

Dec. 19, 1984 [DE] Fed. Rep. of Germany ....... 3446248

[51] Int. Cl.[4] .......................... G01D 3/04; B60C 23/04
[52] U.S. Cl. ........................... 364/571.02; 364/571.01; 340/501; 340/442; 73/146.2
[58] Field of Search ................... 364/556, 558, 571.01, 364/551, 571.02; 73/12, 146.2, 146.5, 146.8; 140/52 R, 52 F, 501, 517, 521

[56] References Cited

U.S. PATENT DOCUMENTS

| | | | |
|---|---|---|---|
| 4,300,118 | 11/1981 | Matsuda et al. | 73/146.5 |
| 4,303,984 | 12/1981 | Houvig | 364/571 |
| 4,337,652 | 7/1982 | Matsuda et al. | 73/146.5 |
| 4,467,641 | 8/1984 | Abraham | 73/146.5 |
| 4,494,183 | 1/1985 | Bayer et al. | 364/571 |
| 4,567,459 | 1/1986 | Folger et al. | 73/146.5 |
| 4,567,460 | 1/1986 | Gebler | 73/146.5 |
| 4,578,992 | 4/1986 | Galasko et al. | 73/146.5 |
| 4,651,292 | 3/1987 | Jeenicke et al. | 364/571 |

FOREIGN PATENT DOCUMENTS 0045401 2/1982 Fed. Rep. of Germany .

*Primary Examiner*—Parshotam S. Lall
*Assistant Examiner*—V. N. Trans
*Attorney, Agent, or Firm*—Michael J. Striker

[57] ABSTRACT

A sensor is suggested for measuring physical dimensions as well as a method for balancing its measuring values, whereby an evaluation circuit is used for the calculation of the accurate measuring value. The sensor (10) is combined with a PROM (15) into a structural unit (19), whereby the correction values for the measuring signals of sensor (10) are stored in PROM (15). Sensor (10) and PROM (15) have at least one output (18) through which the measuring signals as well as the correcting data have to be transmitted to evaluation circuit (30).

6 Claims, 1 Drawing Sheet

SENSOR FOR MEASURING PHYSICAL DIMENSIONS AND PROCESS FOR BALANCING THE SENSOR

This application is a continuation of application Ser. No. 907,689, filed Aug. 14, 1986, now abandoned.

STATE OF THE ART

The invention is based on a sensor for measuring physical quantities. In known sensors, wherein the resistor value of the sensor changes in dependency on pressure fluctuations or temperature fluctuations a relatively expensive balancing or adjusting network is required for correcting the measuring signals which are immediately emitted from the sensor and with which the sensor characteristic curve is linearized, the temperature range is compensated, the spread between units is eliminated and different offset voltages have to be balanced (Elektronik, Heft 13, 1984, page 95). In addition, the different resistors of the adjusting network, which is disposed on a chip together with the sensor elements, must be adjusted on a measuring test bench by means of a Laser beam. Since such sensors are mainly connected to a digitally operating evaluation circuit for pressure measuring and temperature measuring, it is already known to combine the sensor into an operational unit with a microprocessor, whereby the microprocessor is inserted between the sensor elements and the evaluation circuit and into which all correcting quantities or dimensions to be considered for the signal preparation are fed (ETZ Band 105 (1984), Heft 15, page 800 ff). The output signal of such an operational unit is no more subjected to errors due to the signal preparation in the microprocessor and consequently can be further processed by the evaluation circuit for a measuring value indication or for influencing control circuits and control paths. Very often the evaluation circuit is provided with a further microprocessor or microcomputer. This solution is also very expensive since in addition to the microprocessor in the evaluation circuit a further microprocessor is required on the chip of the sensor.

The subject solution intends to equip the sensor in such a manner that the evaluation circuit being present is also used for correcting the sensor signals.

ADVANTAGES OF THE INVENTION

The combining of the inventive sensor with a programmable read-only memory or a so-called PROM to form a structural unit is advantageous in that only the correcting values of each sensor are stored in the associated PROM in the structural unit and may be called during use of the sensor together with the sensor signals by the connected evaluation circuit. In this manner the program of the evaluation circuit can be used for correcting the measuring signals emitted from the sensors. Thereby a high or very high measuring accuracy may be obtained with respect to linearity of the transmitter characteristic curves, the temperature range, the spread between units and the offset values. A further advantage consists in that, in particular with high quantities considerable cost advantages may be obtained with respect to the known solutions, since a balance network or a further processor for the sensor balance is eliminated.

It is particularly advantageous to feed the measuring signals of the sensor and the correcting values from the storage through a common output bit-serial or bit-parallel to the evaluation circuit. Thereby, it is advantageous to use the output also as the input for the energy supply for the sensor and the storage. If measuring signals corresponding, for example, to the air pressure or the temperature of a vehicle tire are to be transmitted from a rotating sensor to a stationary evaluation sensor, advantageously the output of the structural unit is connected with a transmitter coil which is inductively coupled with a further transmitter coil being connected with the evaluation circuit. Thereby, the structural unit of the sensor is disposed on the vehicle wheel in such a manner that the transmitter coil during each full wheel rotation is positioned in at least one circumferential range opposite of the other transmitter coil which is disposed stationary in the proximity of the wheel. Thereby, in an advantageous manner the sensor is coupled with the output by means of an A/D-converter. According to the invention, the sensor, the A/D-converter, the read-only storage and the output are disposed on a chip as a structural unit.

A plurality of measuring states are applied to a measuring test stand to determine the correcting values to be stored in the PROM. These measuring values are then compared with the predetermined actual measuring values and a correction value is formed which finally is written into the PROM as a table value or as a parameter for a mathematical adjustment formula.

DRAWING

Exemplified embodiments of the invention are illustrated in the drawing and are explained in more detail in the following description.

Figure 2:
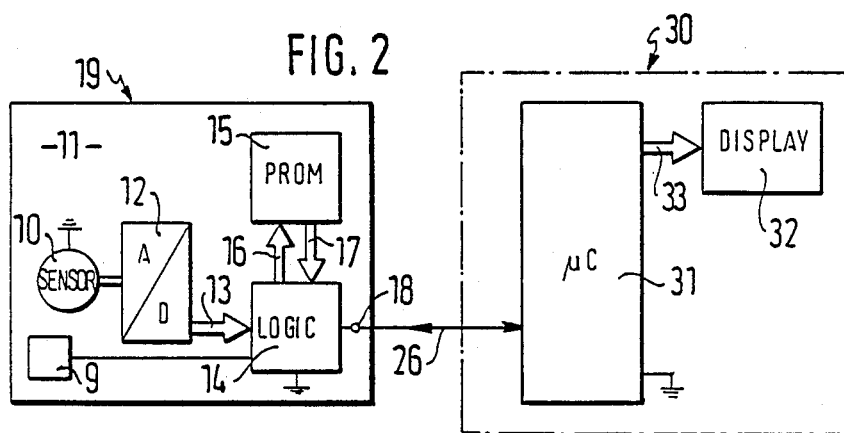
Figure 3:
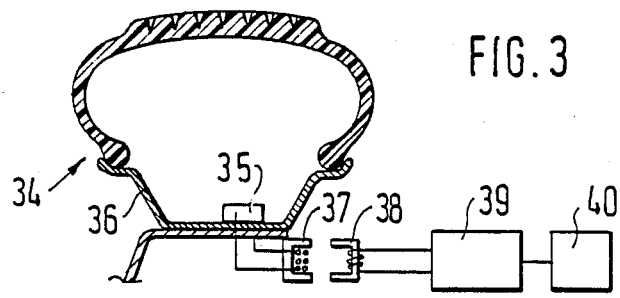

FIG. 1 illustrates a sensor structural unit in accordance with the invention with a connected data adjusting circuit for programming the PROM, FIG. 2 illustrates the sensor structural unit connected to an evaluation circuit, and FIG. 3 a tire pressure-monitoring with a sensor-structural unit in accordance with FIG. 1

DESCRIPTION OF THE EXEMPLIFIED EMBODIMENT

FIGS. 1 and 2 illustrate a known pressure sensor 10 with at least one pressure dependent variable resistor. The pressure sensor 10 is disposed on a chip 11 which consists of an electrically nonconductive material. A ceramic or synthetic plate may be used as a chip 11. Furthermore, an analog/digital converter 12 is disposed on chip 11, whose analog-input is connected with the terminals of sensor 10. Simultaneously, a preamplifier is integrated in the A/D converter. The digital output of converter 12 is connected by means of a bus 13 with a logic circuit 14 which is also disposed on chip 11, In furtherance, a PROM 15 is disposed on chip 11 a s a programmable nonvolatile storage which is connected with logic circuit 14.by means of buses 16 and 17. Logic circuit 14 is grounded and connected with an output terminal 18. The pressure sensor 10 together with PROM 15, the A/D converter 12 and logic circuit 14 form a structural unit 19 on chip 11 which is to be installed on a measuring location provided for continuous pressure measuring.

Since the sensor structural unit 19 does not have its own energy supply in this embodiment, but only an energy storage 9, the output 18 simultaneously acts as an input for the energy supply of pressure sensor 10, PROMs 15 and the A/D converter 12. The pressure sensor 10 emits an analog signal to the A/D converter, the signal being dependent on a pressure P excerted on the sensor and is then fed through bus 16 as a digital signal to logic circuit 14. Since the pressure sensor 10 is subjected to individual measuring errors due to a nonlinear characteristic curve, a temperature, the deviations between units and by offset voltages these have to be taken into consideration when evaluating the measuring signals of the pressure sensor 10.

For this purpose the sensor structural unit 19, before its completion, is mounted onto a measuring test stand 20, as illustrated in FIG. 1, which contains a pressure chamber 21 acting on pressure sensor 10. Moreover, the measuring test stand 20 is provided with a data adjusting circuit 23 which is designed as a microprocessor in the exemplified embodiment. For its programming PROM 15 is connected by means of a data bus 24 and an address bus 25 with the adjusting circuit 23. The output 18 of the sensor structural unit 19 is also connected with the adjusting circuit 23 by means of line 26 and thereby the energy supply of structural unit 19 is assured through the microprocessor µP. Different control commands are fed through connecting lines 26, 27, and 28 to measuring test stand 20.

For correcting or adjusting the error subjected measuring values of pressure sensor 10 a plurality of measuring value or states have to be passed on the measuring test stand 20 in that, for example, the pressure in pressure chamber 21 is stepwise increased to predetermined values by feeding corresponding control commands through connecting line 27. For each of the passing measuring states the measuring signal generated by the pressure sensor 10 is fed through the A/D converter 12, the logic circuit 14 and the connecting line 26 as an actual value to the adjusting circuit 23. There it is compared with the nominal value of the measuring state which had been called through connecting line 27 and which corresponds to the actual pressure in pressure chamber 21. In this manner a correcting value or a parameter for a mathematical correcting formula is determined from the actual value and the nominal value for all measuring states. During the later use of the pressure sensor in connection with an evaluation circuit, the correcting value or the mathematical correcting code must be taken into consideration by the evaluation circuit. Finally, each of the determined correction values or correction code is applied through the data bus 24 and the address bus 25 from the adjusting circuit 23 to an assigned storage location in PROM 15.

Since the signals transmitted from sensor 10 are very often influenced by further interfering magnitudes, for example, temperature fluctuations, this interference may also be taken into consideration and determined in the same manner as described above. For this purpose, the individual measuring states are passed as parameters through the measuring test stand 20 for different interference magnitudes. The corresponding correcting values are determined in the adjusting circuit 23 and finally stored in corresponding associated storage locations of PROM 15. By a corresponding programming of the adjusting circuit 23 it is possible that at first all correcting values or the mathematical correcting formula for the pressure sensor 10 are determined by the adjusting circuit 23 and are temporarily stored therein. Subsequently they can be again tested and, if need be, corrected and finally written into PROM 15. After the correcting values or the mathematical formula is stored in PROM 15, the data bus 24 and the address bus 25 are disconnected from PROM 15 and in a last finishing step the electronic structural parts 12, 14 and 15 of the sensor structural unit 19 are encapsulated in insulating material, so that the address and data inputs of PROM 15 are no longer accessible.

FIG. 2 illustrates the finished sensor structural unit 19 which can be connected with further sensors, not shown, in the motor vehicle. The output 18 of the unit 19 is connected via line 26 to a bit serial input of a microprocessor 31 of a drive data computer 30 as evaluation circuit. The microprocessor 31 is connected to a display 32 through a data bus 33. In the exemplified case, the energy supply of pressure sensor 10 and the electronic structural elements 12, 14 and 15 is performed by the microprocessor 31 through the output line 26. Moreover, control commands are transmitted from the microprocessor 31 to the logic circuit 14 of the sensor structural unit 19 through the line 26, so that the logic circuit alternately directs either the correcting data stored in PROM 15 or the sensor signals converted in the A/D converter 12 into the microprocessor 31. Therefore, the output 18 of the sensor structural unit 19 is simultaneously the input for the energy supply of construction unit 19 as well as for the control commands to logic circuit 14. Finally, the digital sensor signals are corrected in the microprocessor 31 with the corresponding correction values and are displayed on a display 32 or are processed with other values fed into microprocessor 31 or read in by other sensors. Thereby, the obtainable measuring accurateness increases with the number of the measuring states which were passed through the measuring test stand 20. The correcting values may be stored in PROM 15 in the form of tables or as a mathematical code for computing the correcting values.

FIG. 3 illustrates the use of a pressure sensor structural unit in accordance with the invention for monitoring the tire pressure in a motor vehicle. Here, a sensor structural unit 35 is disposed in the base of a wheel rim 36. For the energy supply of the sensor structural unit 35 as well as for emitting measuring signals and emitting the correcting values which are stored in a storage of the sensor structural unit 35 a transmitting coil 37 being mounted on rim 36 is inductively coupled with a further stationary mounted transmitting coil 38 being mounted on the wheel suspension. The stationary transmitting coil 38 is connected with an evaluation circuit 39 with which also the remaining pressure sensors, not shown are connected on the wheels of the vehicle in a corresponding manner. The rotating part of the transmitter is in form of a ring, so that the transmitter operates independently of the angular position of the wheel. Thereby, energy is transmitted by means of a voltage converter 40 delivering a series of pulses via the transmitter coils 38 and 37 to the sensor structural unit 35. Moreover, control commands are frequency modulated with the pulses and transmitted to the evaluation circuit 39. The transmission of the measuring values for the tire pressure measured by the pressure sensor as well as the transmission of the correcting values stored in the storage of the structural unit 35 is also performed by means of a corresponding frequency modulated pulse sequence which is received and processed by the evaluation circuit 39.

The invention is not limited to the described exemplified embodiments because modifications are possible on the sensor structural unit as well as in the signal transmission and energy supply. Instead of pressure sensors, temperature sensors may be made in the same manner and may be balanced in accordance with a corresponding process. The programmable, nonvolatile storage and the sensor of such a sensor structural unit may be separately connected with the evaluation circuit, so that the measuring signals of the sensor and the correction values of the storage are transmitted bit-serial or bit-parallel to the different inputs of the evaluation circuit. Furthermore, it is possible to connect the sensor with its analog measuring signals immediately to the evaluation circuit without logic 14 and A/D-converter 12.

It is essential for the invention that the sensor is combined with the storage 15 into a structural unit, wherein the correcting data required for the adjustment of the sensor signal are so stored that they also can be transmitted to an evaluation circuit in the same manner as the sensor signals. Thereby, the sensor structural unit and the evaluation circuit represent two systems operating at two different locations. For example, while switching on the supply voltage the correcting data or the mathematical code for computing the data, are read out from the storage 15 of the sensor-structural unit and transferred into the evaluation circuit 31 where they are temporarily stored. Thereafter only the measuring signals of the sensor are transmitted to the evaluation circuit and with the assistance of the correcting data the accurate measuring value is calculated.

What is claimed as new and desired to be protected by Letters Patent is set forth in the appended claims:

1. Sensor arrangement for measuring physical quantities and transmitting electric signals depending on the measured quantity, comprising a sensor for generating measuring signals corresponding to a measured physical quantity; an energy store; an A/D convertor connected to the sensor; a programmable non-volatile storage for storing a mathematical code for computing a set of correction data correlated to the measuring signals of the sensor for a predetermined number of states of the physical quantity; a logic circuit having one input connected to said A/D convertor, another input connected to said storage and a serial data input/output; said sensor, A/D convertor, energy store, non-volatile storage and logic circuit being mounted on a common plate to form a single structural unit wherein said serial data input/output is connected as an input for control commands to said logic circuit and for supplying said energy store; and said logic circuit directing, in response to corresponding control commands, the measuring data from said A/D and the matematical code from said storage to said data output.

2. Sensor arrangement as defined in claim 1 wherein said serial data input/output is connected to an evaluation circuit for receiving said measuring data and said mathematical code, computing from said mathematical code a set of correction data correlated to the measuring data for a predetermined number of test states of the measured quantity, and evaluating the measuring data according to corresponding correction data.

3. Method in accordance with claim 2, wherein the correcting values which are successively determined by the adjustment circuit are at first temporarily stored in an intermediate storage and subsequently written into the non-volatile storage of the structural units.

4. Sensor arrangement in accordance with claim 2, wherein said serial data input/output is connected to a transmitter coil which is inductively coupled with a further transmitter cil being connected with the evaluation circuit.

5. Sensor arrangement in accordance with claim 4, wherein the structural unit is disposed on a vehicle wheel in such a manner that during ech full wheel rotation the first mentioned transmitter coil is located opposite the further transmitter coil which is stationary and disposed in proximity of the wheel.

6. Method of correcting measuring values of signals transmitted from a sensor of a physical quantity, comprising the steps of
(a) mounting on a common plate a sensor, a PROM, an energy store, an A/D convertor connected to said sensor, a logic circuit having a serial data I/O terminal and being connected for directing energy from said I/O terminal to said energy store and therefrom to said A/D convertor and said PROM, and further directing data from said A/D convertor and said PROM to said I/O terminal;
(b) temporarily connecting said PROM and said serial data I/O terminal to an adjusting circuit;
(c) measuring by said sensor a succession of predetermined test states of said physical quantity;
(d) comparing in said adjusting circuit the actual measuring values of the sensor signals transmitted at the respective test states with nominal values corresponding to the respective test states of the physical quantity, and determining the deviations of successive actual measuring values from the nominal ones;
(e) storing the successive deviations as correction values in said PROM, and permanently disconnecting said PROM and said serial data I/O terminal from said adjusting circuit; and
(f) connecting said serial I/O terminal to an evaluation circuit for receiving measuring data from said A/D convertor and corresponding correction data from said PROM, and evaluating the measuring data according to the correction data.

* * * * *